US007042590B2

(12) United States Patent
Young

(10) Patent No.: US 7,042,590 B2
(45) Date of Patent: May 9, 2006

(54) PRINTER BASED PRINTING SYSTEM AND METHOD

(75) Inventor: Bruce M. Young, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 907 days.

(21) Appl. No.: 09/814,377

(22) Filed: Mar. 19, 2001

(65) Prior Publication Data

US 2002/0131066 A1    Sep. 19, 2002

(51) Int. Cl.
*G06F 15/00* (2006.01)
(52) U.S. Cl. .................. 358/1.18; 358/1.15; 358/1.16; 358/1.9
(58) Field of Classification Search ............ 358/1.18, 358/1.15, 1.16, 1.9; 700/117; 270/52.02; 710/62, 72; 707/513; 709/202
See application file for complete search history.

(56) References Cited

U.S. PATENT DOCUMENTS 5,465,213 A * 11/1995 Ross ..................... 700/117
6,738,841 B1 * 5/2004 Wolff ...................... 710/62

FOREIGN PATENT DOCUMENTS

WO    WO00/49489    8/2000

* cited by examiner

*Primary Examiner*—Twyler M. Lamb

(57) ABSTRACT

In accordance with this invention, systems and corresponding methods for printing one or more files stored in computing systems in a communication network are provided. In one or more embodiments, a user interacts with control menus or buttons provided on a network printing device to select one or more documents stored on computing systems attached to the network. Selected documents are then converted to printable format and printed at the printing site without the user having to step away from the site.

20 Claims, 3 Drawing Sheets

PRINTER BASED PRINTING SYSTEM AND METHOD

BACKGROUND

1. Field of the Invention

The present invention relates generally to printing methods and systems and, more particularly, to printing services in a communications network.

Copyright & Trademark Notice

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed to limit the scope of this invention to material associated with such marks.

2. Related Art

Currently, to print one or more documents a user interacts with a computing system such as a personal computer or a computer terminal connected to a computer network. Using the computing system, the user submits a print request for printing one or more pages of the document. The printer then processes each request in order of priority and services each request. Computer software can be executed on the computing system to allow a user to manipulate the printing order for each request, to pause the printing process, or to delete a print request if queued.

Unfortunately, once a print request is submitted and the print data is transferred to the printer, the user loses control over the printing process. In other words, documents that are entered into the print queue are typically printed without the user having a chance to decide when he wishes for the printing process to start or end. This lack of control over the printing process is undesirable, especially when the printer is not within the immediate vicinity of the computing system where the print request is initiated. For example, in the case of a shared network printer, multiple print requests may be submitted by multiple users. Some or all of these users may be unable to immediately retrieve the printed results, due to time or distance constraints.

Without the intervention of a human operator, in most instances printing to a shared printer can be chaotic. For example, the users will have to sort through the multiple printed material to ensure that they pick the printed material and pages that belong to them. Also, processing and printing large files occasionally may take a very long time. As a result, a user with a smaller print job may have to wait for a larger print job to finish if the print request for the smaller job was received later than the larger one. In our quest for instant gratification, these results can be rather frustrating. It would be very useful, if the users have the option to select a file for printing at the printing location by interacting with the printing unit, instead of having to print from a remote computing system where the document is stored.

Some printing systems are currently available that can be configured to store a certain number of electronic files in printable format in volatile memory storage media. A user can then directly access the printable files stored in printer memory by interacting with the printer. Said printing systems, however, do not allow a user to directly access other electronic files stored on remote computing systems and the number of files that can be stored in the printer memory are limited as the memory has a fixed capacity. Especially, the current printing systems do not allow a user to access or print files that are not in printable format. Further, current printing systems do not provide the user with any printing options, such as duplexing, stapling, or other services that may be available at the printing site.

Systems and methods that allow a user to access and print an electronic file stored on a remote computing system in a communication network from a printing device attached to that network are desirable.

SUMMARY

In accordance with this invention, systems and corresponding methods for printing one or more files stored in computing systems in a communication network are provided. In one or more embodiments, a user interacts with control menus available at a printing site to select one or more documents stored on computing systems attached to the network. Selected documents are then converted to printable format and printed at the printing site without the user having to step away from the site.

For purposes of summarizing, certain aspects, advantages, and novel features of the invention have been described. It is to be understood that not necessarily all such advantages may be achieved in accordance with any one particular embodiment of the invention. Thus, the invention may be embodied or carried out in a manner that achieves or optimizes one advantage or group of advantages as taught without necessarily achieving other advantages as may be taught or suggested herein.

In one embodiment, a system for selecting and printing one or more documents accessible via a communication network includes a printing device attached to the communication network, said printing device including: control interface for selecting a document accessible via the communication network; executable code stored in a memory, wherein in response to user interaction with the control interface the code is executed by a processor to cause the system convert a selected document to printable format and print the document at the printing device.

In another embodiment, a method for selecting and printing one or more documents accessible via a communication network at a printing site includes: interacting with a printing device attached to the communication network at the printing site; selecting a document stored on a computing system attached to the communication network; converting the selected document to a format suitable for printing on the printing device; transferring the converted document to the printing device; and printing the document on the printing device.

In still another embodiment, a printing system for selecting and printing one or more documents accessible via a communication network at a printing site includes: a means for selecting a document accessible via the communication network; a means for converting the selected document to printable format; and a means for printing the document on a printing device attached to the communication network at the printing site.

These and other embodiments of the present invention will also become readily apparent to those skilled in the art from the following detailed description of the embodiments having reference to the attached figures, the invention not being limited to any particular embodiments disclosed.

DETAILED DESCRIPTION

Figure 1:
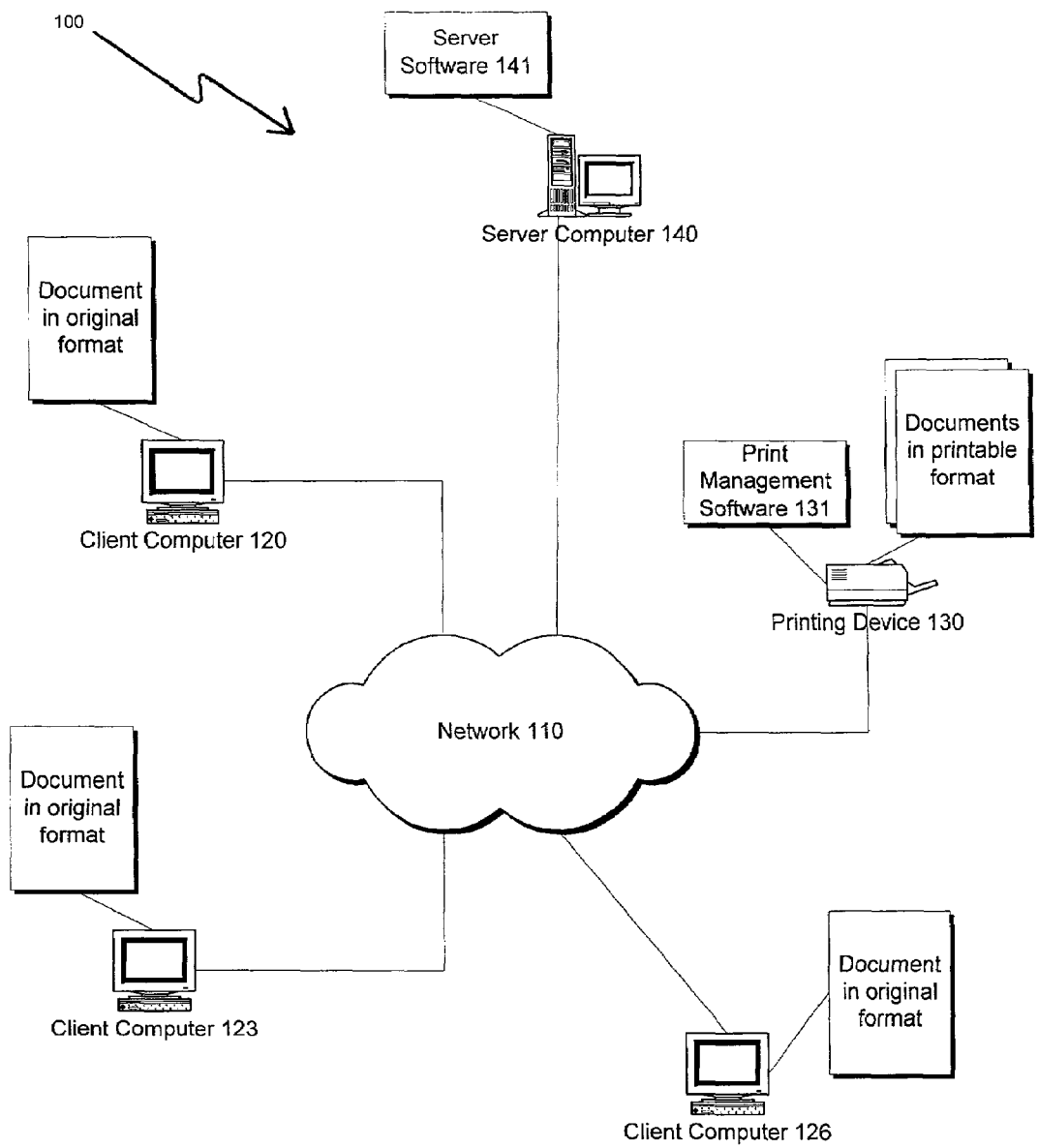
FIG. 1 illustrates a block diagram of an environment in which a system of the present invention may operate, in accordance with one or more embodiments.

In accordance with this invention, printing services are provided that allow a user to access and print documents available on a communication network from a network printing device. Once the user selects the desired documents, the user can then cause the system to print the selected document at the printing device without having to go back to a workstation or computing system attached to the network at a different location.

Printing services and services are used interchangeably. The services provided by the system of this invention, may be provided remotely, in one or more embodiments, and/or through an on-line service provider. A service provider is an entity that operates and maintains the computing systems and environment, such as server system and architectures, that promote printing of documents in a communication network from a printing device attached to the network. Typically, a server architecture includes the infrastructure (e.g., hardware, software, and communication lines) that stores and offers the printing or online services of this invention.

In the following, numerous specific details are set forth to provide a thorough description of various embodiments of the invention. Of course, certain embodiments of the invention may be practiced without these specific details or with some variations in detail. Embodiments of the present invention are understood by referring to FIGS. 1–3 of the drawings. Throughout the drawings, components that correspond to components shown in previous figures are indicated using the same reference numbers.

Nomenclature

The detailed description that follows, in part, refers to terms of processes and symbolic representations of operations performed by conventional computers, including computer components. For the purpose of this disclosure, a computer may be any microprocessor or processor (hereinafter referred to as processor) controlled device such as, by way of example, personal computers, workstations, servers, clients, mini-computers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof.

The computer may possess input devices such as, by way of example, a keyboard, a keypad, a mouse, a microphone, or a touch screen, and output devices such as a computer screen, printer, or a speaker. Additionally, the computer includes memory such as a memory storage device or an addressable storage medium. The computer may be equipped with a network communication device such as a network interface card, a modem, or other network connection device suitable for connecting to one or more networks and printing devices.

The computer may be a uniprocessor or multiprocessor machine. Additionally the computer, and the computer memory, may advantageously contain program logic or other substrate configuration representing data and instructions, which cause the computer to operate in a specific and predefined manner. The program logic may advantageously be implemented as one or more modules. The modules may be configured to reside on the computer memory and execute on one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be also understood that manipulations within the computer are often referred to in terms of adding, comparing, moving, searching, or the like. These manipulations may or may not involve a human operator. For the most part, the operations described herein are operations performed by a computer or a machine in conjunction with a human operator or user that interacts with the computer or the machine. The programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein.

System Architecture

Referring now to the drawings, FIG. 1 illustrates an environment in which a printing system 100 according to one embodiment may operate. In accordance with one aspect of the system, the environment includes one or more client computers (e.g., client computers 120, 123, and 126), server computer 140, and printing device (i.e., printer) 130. As depicted, client computer 120, server computer 140, and printing device 130 are connected to a communication network 110. In certain embodiments, printing device 130 may be directly connected to client computer 120 without the intervention of network 110. The terms "connected," "coupled," or any variant thereof, mean any connection or coupling, either direct or indirect, between two or more elements. The coupling or connection between the elements can be physical, logical, or a combination thereof.

A user uses software applications installed on a client computer (e.g., client computers 120, 123, and 126) to create one or more documents. Depending on the type of software application used documents are created and stored in various application formats. For example, a document created using Microsoft Word® in addition to text includes proprietary codes and headers that indicate the formatting features of the text as it will be printed or displayed on the screen. Documents are typically stored as computer readable code on a storage medium (e.g., a hard drive, CD ROM) in form of optical, digital, or magnetic signals.

It is conventional for those skilled in the art to refer to these signals as bits, values, elements, symbols, characters, text, terms, numbers, records, files, or the like. Depending on the type of printing device, these signals are converted into signals that can be processed by the printing device before or at the time of printing the document. Thus, a document in the native application format (i.e., original format) needs to be converted into a printable format for a particular printer prior to printing. Examples of currently used printable formats include Printer Command Language (PCL), PostScript, and Portable Document Format (PDF).

Server computer 140, in accordance with one aspect of the system, includes server software 141 for converting a selected document from its original format to printable format. Communications network 110 provides the means for transferring data between client computer 120, server computer 140, and/or printing device 130. Once a document is converted to printable format it is transferred to printing device 130 in form of a print request, via communications network 110.

Print management software 131 is executed on printing device 130 and causes the system to queue print requests in memory, process the documents associated with each request, and print out the documents. Network 110 may be established by way of wired or wireless technology in a well-known manner, or can be any type of communication network, such as the Internet, for example. One of ordinary skill in the art will appreciate that network 110 may advantageously be comprised of one or a combination of various types of networks without detracting from the scope of the invention. Network 110 can include, for example, local area networks (LANs), wide area networks (WANs), public internets, private intranets, interactive television networks, wireless data transmission networks, two-way cable networks, satellite networks, interactive kiosk networks, and/or any other suitable communication network.

Printing device 130 can be any kind of printer and includes an adapter card for connecting to communication network 110. Printing device 130 additionally may include hardware and software necessary for servicing print requests or may serve as a stand alone printer connected to a print server such as server computer 140. In the former implementation, printing device 130 includes a processor and memory means to directly retrieve, convert, store, and print documents from client computer 120; while in the latter implementation, server computer 140 performs the initial tasks of retrieving and converting documents from their original format to printable format, and then forwards data in printable format to printing device 130 for printing.

In one or more embodiments, printing device 130 includes a print queue, a display screen, and control buttons to allow a user to interact with printing device 130 to select and print document that are stored on client computers attached to network 110. The print queue is a logical storage area associated with space allocated in memory for storing documents in printable format. Embodiments of the system may include pointing or input devices (e.g., mouse, keyboard) to provide for user interaction with printing device 130.

The print queue can be implemented in Random Access Memory (RAM) or other suitable memory known to those skilled in the art for storing data. Various areas on the display screen can be graphically divided into areas displaying a menu bar, buttons, and a document list. A navigation menu allows a user to navigate within network 110's file system and to select and print certain documents and files. For example, a menu bar and associated interactive graphic user interface (GUI) features (e.g., drop down lists, buttons) allow a user to operate printing device 130. By interacting with the GUI a user can display, view, select, and print one or more documents from the file system.

In embodiments of the invention, printing device 130 is manufactured by Hewlett-Packard Company, Palo Alto, Calif., and includes a paper feeding mechanism for feeding a paper along a transfer path and a carriage to respond to said paper feeding mechanism. Further, a printing head is attached to the carriage and a cylindrical platen is disposed to confront the printing head with the paper fed by the paper feeding mechanism in the transfer path. A driving mechanism is also included to drive the platen and the paper feeding mechanism.

In accordance with at least one embodiment, the driving mechanism includes a driving motor and a gear train for transmitting rotation of the single driving motor to the platen and the paper feeding mechanism. The rotation of the platen and paper feed by the paper feeding mechanism are synchronized with each other so that positions of impacts on a peripheral surface of the platen by the printing head are distributed over a whole region on the surface of the platen. Other embodiments are possible and can be directed to line printers, laser printers, ink jet printers, color printers, or any other suitable printer mechanism.

As used herein, the terms server computer, printer server, or printing system are to be viewed as designations of one or more computing systems that include server or print management software for servicing print requests submitted by a user interacting with printing device 130 to retrieve and print documents from client computer systems connected to network 110. These terms are not to be otherwise limiting in any manner. The server and print management software, for example, may be comprised of one or more modules that execute on one or more computing systems, as described in further detail below.

Hardware & Software Environments

Typically, a computing system is composed of two environments, a software environment and a hardware environment. The hardware environment includes the machinery and equipment that provide an execution environment for the software. On the other hand, the software provides the execution instructions for the hardware.

In operation, a computing system needs both hardware and software to function. The software can be divided into two major classes including system software and application software. System software includes control programs, such as the operating system (OS) and information management systems that instruct the hardware how to function and process information. An example of system software is Microsoft Windows 2000® operating system generally used for managing the operation of personal computers.

Application software is a program that performs a specific task. In embodiments of the invention, system and application software are implemented and executed in one or more hardware environments to retrieve documents from one or more client computers in network 110, to convert the documents from their original format to printable format, and to print the documents on printing device 130. The documents selected for printing are created in their original format by one or more software applications executing on client computer 120, for example.

Figure 2A:
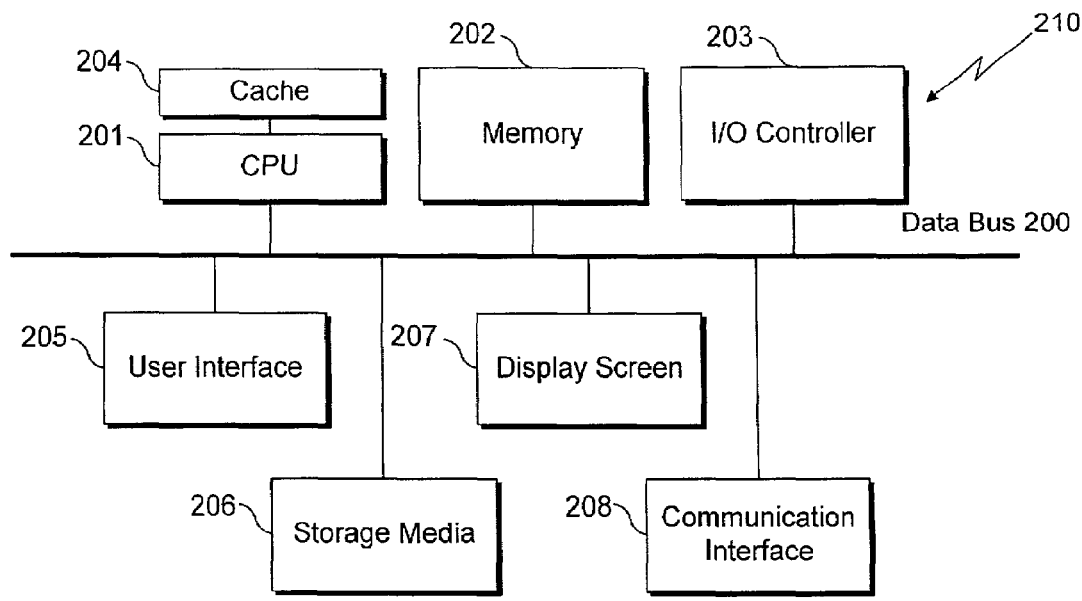
FIGS. 2A and 2B illustrates the software and the hardware environment that promote the operation of the system illustrated in FIG. 1, in accordance with one or more embodiments.
Figure 2B:
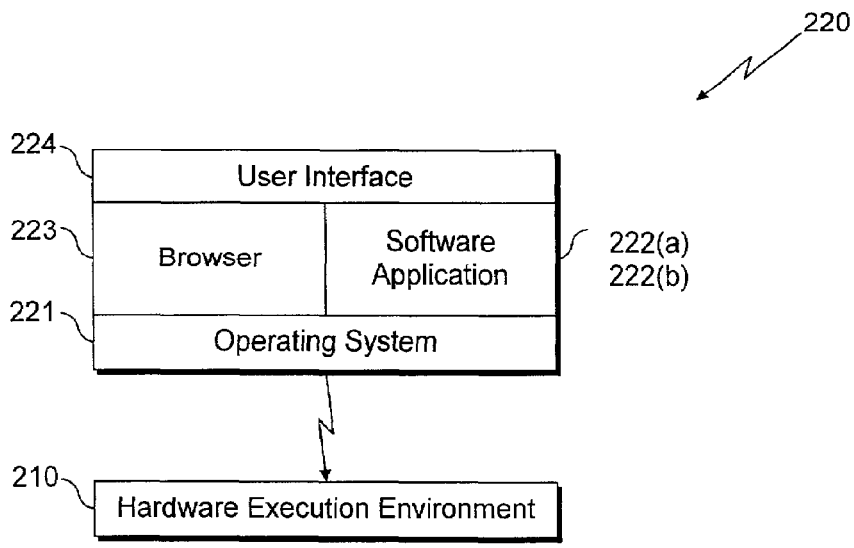

The invention may be practiced either individually or in combination with suitable hardware or software architectures or environments described in further detail below. For example, client computer 120, server computer 140, and printing device 130 may be implemented in association with computing system 210 (FIG. 2A). Client and server software running on the above systems, including print management software 131 may be implemented in association with one or multiple modules as software system 220 (FIG. 2B). The following hardware and software embodiments are provided by way of example. It should be noted that certain hardware and software components may be interchangeably implemented in form of software or hardware, in one or more embodiments of the invention.

Hardware Environment

An embodiment of the system can be implemented as computer software including one or more modules in form of computer readable code executed on one or more of server computer 140, printing device 130, or client computer 120 each of which may include components of a general purpose computing system 210. FIG. 2A illustrates an example of the components of computing system 210. Computing system 210 includes a central processor unit (CPU) 201, a main memory 202, an input/output controller 203, optional cache memory 204, user interface devices 205 (e.g., keyboard, pointing device), storage media 206 (e.g., hard drive, memory), a display screen 207, a communication interface 208 (e.g., a network card, a modem, or an integrated services digital network (ISDN) card), and a system synchronizer (e.g., a clock, not shown in FIG. 2A).

Processor 201 may or may not include cache memory 204 utilized for storing frequently accessed information. One or more input/output devices such as a printing or a scanning device may be attached to computing system 210. A communication mechanism, such as a bi-directional data bus 200, can be utilized to provide for means of communication between system components. Computing system 210 may be capable of communicating with one another and other systems through communication interface 208.

In one or more embodiments, computing system 210 may not include all the above components, or may include additional components for additional functionality or utility. For example, computing system 210 may be able to send messages and receive data through communication interface 208. In embodiments of the system, communication interface 208 can send and receive electrical, electromagnetic, or optical signals that carry digital data streams representing various types of information including program code. If communication is established via the Internet, for example, computing system 210 may transmit program code through an Internet connection. The program code can be executed by central processor unit 201 or stored in storage media 206 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are CD-ROM disks, ROM cards, floppy disks, magnetic tapes, computer hard drives, and network server systems.

In one or more embodiments of the invention, processor 201 is a microprocessor manufactured by Motorola, Intel, or Sun Microsystems Corporations. The named processors are for the purpose of example only. Any other suitable microprocessor, microcontroller, or microcomputer may be utilized.

Software Environment

FIG. 2B illustrates computer software 220 suited for managing and directing the operation of the hardware environment illustrated in FIG. 2A. Computer software 220 is, typically, stored in storage media 206 and is loaded into memory 202 prior to execution. Computer software 220 includes system software 221 and software application 222. Depending on system implementation, certain aspects of computer software 220 can be loaded on one or more computing systems (e.g., client computer 120, printing device 130, or server computer 140.)

System software 221 includes control software such as an operating system that controls the low-level operations of computing system 210. Low-level operations include the management of the system's resources such as memory allocation, file swapping, and other core computing tasks. In one or more embodiments of the invention, the operating system is Microsoft Windows 2000®, Microsoft Windows NT®, Macintosh OS®, or IBM OS/2®. However, any other suitable operating system may be utilized.

Software application 222 can include one or more computer programs that are executed on top of system software 221 after being loaded from storage media 206 into memory 202. In a client-server architecture, software application 222 may include client software 222(a) and/or server software 222(b). Referring to FIG. 1 for example, in one embodiment of the invention, client software 222(a) is executed on client computer 120 (not shown), server software 141 is executed on server computer 140, and print management software 131 is executed on printing device 130.

Referring back to FIG. 2B, computer software 220 may also include web browser software 223 for communicating with the Internet. Further, computer software 220 includes a user interface 224 (e.g., a Graphical User Interface (GUI)) for receiving user commands and data. The commands and data received are processed by the software applications that run on the computing system 210. The hardware and software architectures and environments described above are for purposes of example only. Embodiments of the invention may be implemented in any type of system architecture or processing environment.

Software Application for Processing Print Requests

Figure 3:
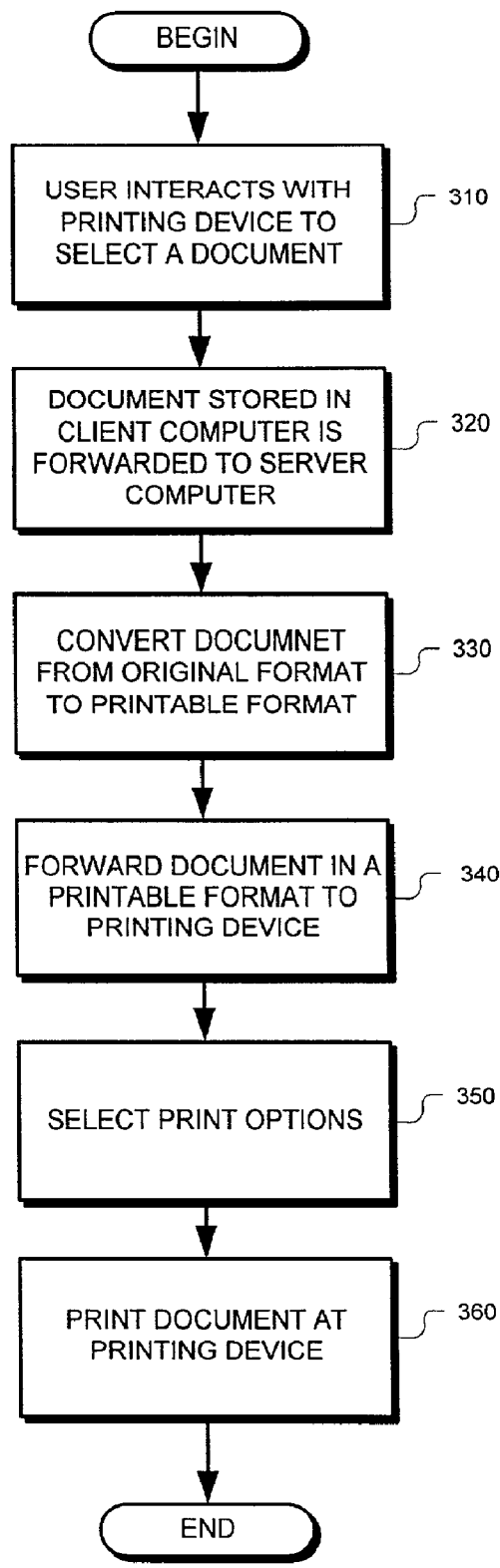
FIG. 3 illustrates a block diagram of a method of selecting and printing documents using the system of FIG. 1, in accordance with one or more embodiments.

The software application of this invention, in one or more embodiments, is implemented to allow a user to interact with network printing device 130 to print one or more documents accessible via network 110. Referring to FIGS. 1 and 3, in accordance with one aspect of the invention, at step 310 a user interacts with printing device 130 to select a document for printing. The document may be stored on any device or computing system, such as client computer 120, attached to network 110. Print management software 131 installed on printing device 130 is implemented so that it can cause printing device 130 to display a list of documents that are available for printing on a display screen, for example, included in printing device 130.

In other embodiments, print management software 131 may provide a user with a navigation menu, such as a file system menu, so that the user can navigate through the file system and select a file for printing. For example, in one embodiment, the file system menu may include references to one or more client computers connected to network 110. Referring to FIG. 1, for example, the file system may provide the user with a list including references to client computers 120, 123, and 126. In some embodiments, a user can access and view the content of files stored on client computer 120, if client computer 120 is connected to the Internet by entering the Uniform Resource Locator (URL) for the client computer. A user can then select one of the computers, for example client computer 120, by interacting with an input device attached to printing device 130. For example, the user may click or touch an icon representing client computer 120.

When the user selects client computer 120, for example, print management software 131 causes printing device 130 to display a list of documents stored locally on client computer 120. In one or more embodiments, to access and view the documents stored on client computer 120, the user needs to enter a user id and/or a password to authenticate against client computer 120 and gain authorized access to content stored thereon. In certain embodiments of the invention, information about the computing system and devices connected to the network and the documents stored on each is available on server computer 140. Thus, print management software 131 communicates with server software 141 executed on server computer 140 to retrieve such information. In other embodiments, print management software 131 directly communicates with client computers attached to network 110 to build a file system that includes information about the documents available on each client computer.

In accordance with one or more embodiments, the navigation menu is implemented such that a user can search a client computer for specific types of documents. For example, a user may want to view all documents created by word processing or imaging software. Or, alternatively, a user may know the exact document he or she is searching for. Interacting with the navigation menu, the user may view or select files with a certain extension or files that can be classified in a certain category or format. Various search options and well-known navigation methods may be implemented in one or more embodiments of the system, as desired. The search features of the system are advantageous to a user in that a user can efficiently find one or more documents within the file system without having to navigate through the hierarchy of the entire file system.

Once the document is selected, then at step 320 print management software 131 submits a request for a copy of the document to be transferred to server software 141 for conversion. This request is serviced by, for example, software executing on client computer 120, or server software 141, or both, depending on system implementation. Documents stored on client computer 120 are typically created by applications executing on the computer and therefore are not in printable format. Thus, for the documents to be printed at printing device 130 the documents need to be converted into printable format. The task of converting the documents to printable format is performed by server software 141 in accordance with one aspect of the system at step 330.

In one embodiment, the task of converting documents from original format to printable format is performed by print management software 131. In this embodiment, the documents are forwarded to printing device 130 instead of server computer 140. In embodiments that server software 141 performs the task of conversion, the document in its original format is forwarded to server computer 140 for conversion first and then, at step 340, the document in its printable format is forwarded to printing device 130. Once printing device 130 receives the document in printable format, the user at step 350 selects a printing option for the document. For example, the user can select to print the document in duplex format, stapled, or hole-punched. Other print options may include print media size, print media type, and print resolution, for example. The act of choosing a printing option can also take place at step 310 after the user has selected the document or prior to step 310. At step 360, print management software 131 causes printing device 130 to print the document.

The embodiments described above are to be considered in all aspects as illustrative only and not restrictive in any manner. Thus, other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

What is claimed is:

1. A system for selecting and printing one or more documents accessible via a communication network comprising:
    a printing device attached to the communication network, said printing device including a control interface configured to allow a user to interact with the printing device to select a document and configured to cause the document to be retrieved from a remote device accessible via the communication network; and
    executable code stored in a memory, wherein in response to user interaction with the control interface the code is executed by a processor to cause the printing device to print the retrieved document.

2. The system of claim 1, wherein the printing device further comprises:
    a display screen and print management software for displaying a file system menu that includes references to one or more computing systems attached to the communication network.

3. The system of claim 2, wherein a user interacts with the control interface to select one of said one or more computing systems from the file system.

4. The system of claim 3, wherein in response to selecting one or more of said computing systems the code is executed by a processor to display a list of documents available on the selected computing system.

5. The system of claim 1, wherein the printing device further comprises software for converting a selected document to printable format.

6. The system of claim 1, further comprising a server system attached to the communication network, said server including server software for converting a selected document to printable format.

7. The system of claim 6, wherein server software forwards a copy of the document in printable format to the printing device.

8. The system of claim 1, wherein the user can interact with the control interface to select a printing option.

9. The system of claim 8, wherein the print option is print media size.

10. The system of claim 8, wherein the print option is print resolution.

11. A method for selecting and printing one or more documents accessible via a communication network at a printing site, said method comprising:

in response to a user interacting directly with a printing device, causing the printing device to initiate a retrieval request for a selected document stored on a computing system;

converting the selected document to a format suitable for printing on the printing device;

transferring the converted document to the printing device based on the retrieval request from the printing device; and printing the document on the printing device.

12. The method of claim 11, wherein:

the printing device includes a control interface for displaying a file system menu that includes references to one or more computing systems.

13. The method of claim 12, further comprising:

selecting one of said one or more computing systems, in response to the user interacting with the control interface.

14. The method of claim 13, further comprising:

displaying a list of documents available on the selected computing systems, in response to selecting one or more of said computing systems.

15. The method of claim 11, further comprising:

interacting with the printing device to select one or more printing options.

16. The method of claim 15, wherein said one or more printing options include print media size.

17. The method of claim 16, wherein said one or more printing options include print resolution.

18. A printing device for selecting and printing one or more documents, said printing device comprising:

means for selecting and causing a document to be retrieved from a remote device, where the means for selecting and causing is configured within the printing device;

means for converting the selected document to printable format; and means for transferring the document to the printing device.

19. The printing device of claim 18 further including means for selecting one or more print options.

20. A printing device comprising:

a control interface for allowing a user to directly interact with the printing device to select a document from a remote device and cause the document to be retrieved from the remote device; and executable code stored in a memory configured to cause the printing device to print the retrieved document.

* * * * *